UNITED STATES PATENT OFFICE.

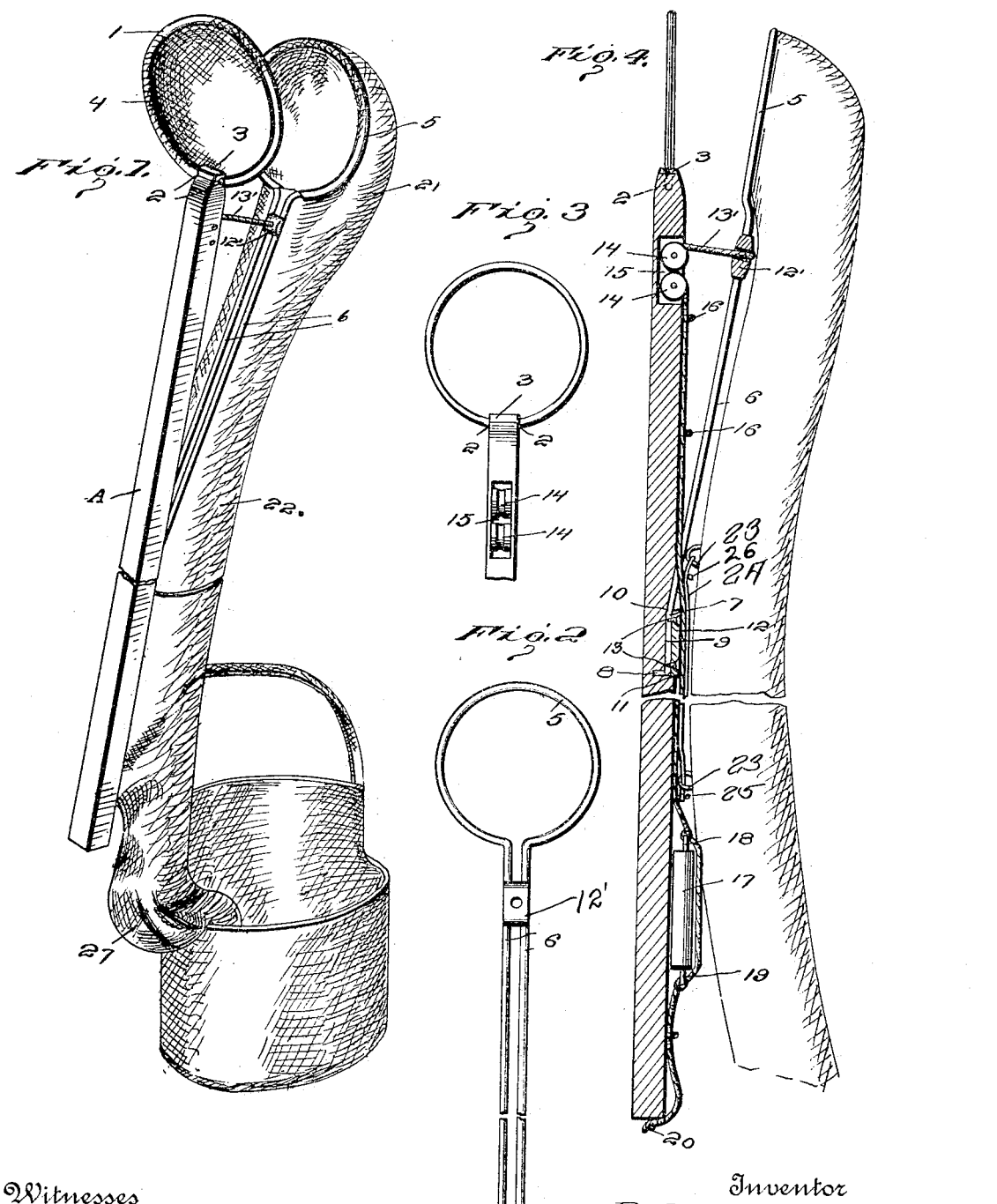

ROBERT E. NORRIS, OF FAYETTEVILLE, ARKANSAS.

FRUIT-PICKER.

1,121,279.

Specification of Letters Patent.

Patented Dec. 15, 1914.

Application filed March 18, 1913. Serial No. 755,150.

*To all whom it may concern:*

Be it known that I, ROBERT E. NORRIS, a citizen of the United States, residing at Fayetteville, in the county of Washington, State of Arkansas, have invented certain new and useful Improvements in Fruit-Pickers; and I do hereby declare the following to be a full, clear, and exact description of the invention, such as will enable others skilled in the art to which it appertains to make and use the same.

This invention relates to certain novel and useful improvements in a device for picking apples, pears and other fruit.

In the present instance it is my purpose to provide a simple and efficient means by which the fruit may be picked from parts or branches of trees which are not readily accessible, and may be carried to a suitable receptacle without bruising or otherwise injuring the same.

With the above recited objects and others of a similar nature in view, my invention consists in the construction, combination and arrangement of parts set forth in and falling within the scope of the appended claims.

In the accompanying drawing:—Figure 1 is a perspective view of a fruit picker embodying my invention, the jaws being shown in open position ready to engage the fruit and the lower end of the fruit conducting tube illustrated in conjunction with a receptacle for receiving the fruit therefrom. Fig. 2 is a view in elevation of the movable jaw detached from the pole or rod, and with the fruit carrying tube removed therefrom. Fig. 3 is a detail view in elevation of the upper portion of the pole and the stationary jaw carried thereby, and showing the pulleys through which the operating cord for the movable jaw is reeved. Fig. 4 is a vertical sectional view taken through the pole and the stationary jaw and illustrating the manner of connecting the stationary jaw and the movable jaw to the pole.

In the preferred embodiment of my invention I illustrate a fruit picker embodying among other features a pole carrying at the top thereof a ring which is provided with a covering of canvas to form a stationary disk or jaw. To one side of the pole I also attach a spring arm which is preferably formed of a single piece of wire bent intermediate its length to form a ring which is designed to constitute a movable jaw and which coöperates with the stationary jaw in plucking the fruit. The wire is then extended in two parallel strands to form a resilient arm for the jaw, the terminals or end portions of the wire being attached to the pole in a peculiar manner so that the resiliency of the arm normally tends to throw it outward or in open position. The ring forming the movable jaw has attached thereto a hood of canvas or other fabric which forms the top of a relatively long tube adapted to conduct the fruit to a suitable receptacle or sack which is preferably carried by the operator, and the lower end of the tube or that part which tends to the center is preferably slackened to form an elbow or fold into which the fruit may fall before dropping into the receptacle so that the liability of bruising or otherwise injuring the fruit is further avoided.

For the purpose of operating the movable jaw I provide a suitable cord or wire which extends alongside the pole and is reeved through suitable pulleys housed in the upper end of the pole and then attached to the resilient arm of the movable jaw directly below the ring of the latter.

Referring now to the accompanying drawings in detail, the letter A indicates a pole which is of any suitable character and of any preferred material and dimensions. At the top of this pole I mount a ring 1 preferably formed of wire, the ends 2—2 of the wire being socketed in the top of the pole, while 3 indicates a clamping plate screwed on top of the pole and further assisting in holding the wire ring in place.

This ring is covered or faced with suitable material, such as canvas or other fabric so that a stationary jaw is formed.

To construct the movable jaw I preferably bend a single length of wire intermediate its ends to form a ring 5 which is of the same size and dimensions as the ring of the stationary jaw, and is designed to coöperate with the latter in plucking the fruit. After bending the wire to form the ring the strands 6—6 are extended parallel to each other for a suitable distance and are then bent at an angle at their lower portions as at 7 and continued in parallelism. The extreme ends or terminals of the lower portions 7 of the strands are bent laterally as at 8 and are embedded in the recessed side 9 of the pole, this recess in the pole forming the shoulders 10—11. A plate 12 covers the recess and the sections 7 of the strands forming the resilient arm of the removable jaw and this plate is secured in place by means of screws 13. The upper shoulder 11 at the recess has a tendency to throw the resilient arm of the movable jaw outward, and this tendency is further increased by the angular inclination of the strand sections 6—6 forming this resilient arm.

Adjacent the point where the upper portion of the resilient arm merges into the ring 5 I arrange an anchor block 12' to which is secured one end of the operating cord 13'. This cord is reeved through a pair of pulleys 14—14 housed one above the other in the recess 15 in the top end portion of the pole. The operating cord then runs down along the inside face of the pole, passing through guide staples or eyes 16 suitably spaced apart along the inner face of the pole. At its lower end so as to be convenient for the operator, I fasten to the cord a handle or grip 17, and if desired the cord may be looped through the upper and lower eyes 18 and 19 respectively at the upper and lower ends of the grip and the terminal of the cord fastened to an eye 20 at the bottom of the pole.

Carried by the ring section 5 or movable plucking jaw is a hood 21 of canvas or other suitable material, and this hood has formed as a continuation thereof, a flexible fruit conducting tube 22 which is of sufficient length to convey the fruit safely to a receptacle such as a sack carried by the operator. It is to be understood that this tube may be made of any suitable material but I prefer to make it of canvas as the latter possesses the requisite durability and strength. To hold this conducting tube in proper position relative to the pole I stitch or otherwise fasten longitudinally of the tube at suitable distances apart, a series of rings 23 and through these rings passes a wire or cord 24 which is fastened at its lower end to the eye 25 on the pole and at its upper end to the eye 26 also carried by the pole. It will thus be seen that the tube is flexibly connected to the pole so that while it may possess a requisite freedom of movement it will always be held properly extended and positioned relative to the pole so that the fruit may pass unimpeded along the tube to the sack.

From the foregoing description taken in connection with the accompanying drawings the construction and operation of my invention will be readily apparent.

As heretofore stated the resiliency of the spring arm of the movable jaw normally tends to throw the jaw in open position ready for plucking the fruit. When it is desired to perform the latter operation it is only necessary to elevate the pole so that the apple or other fruit lies in position between the stationary jaw and the movable jaw. The handle is then gripped and a downward pull given to the operating cord which draws a movable jaw inward toward the stationary jaw and the fruit is grasped between the two jaws and then a slight downward movement or jerk on the pole will separate the fruit from the tree and it will drop into the hood section from which it passes down the tube. The bottom portion of the latter is preferably formed with a fold or slack section 27 so that the fruit will stop therein and not drop suddenly upon the remainder of the fruit within the sack which would be liable to cause bruising. To remove the fruit from the slack or fold in the lower part of the tube, it is only necessary to grasp the folded or slackened portion and elevate it slightly to cause the fruit to roll into the sack.

It will be noted that by means of this device the fruit may be rapidly plucked from the tree and deposited in a receptacle without the liability of bruising or damaging it in any manner. Furthermore my device being composed of relatively few parts may be manufactured and marketed at a comparatively low cost.

While I have herein shown and described the preferred embodiment of my invention I wish it to be understood that I do not confine myself to all of the precise details of construction which are herein set forth by way of illustration, as modification and variation may be made without departing from the spirit of the invention or exceeding the scope of the appended claims.

What I claim is:

1. In a fruit picker, the combination with a pole, of a stationary jaw attached to the top of the pole, a movable jaw comprising a ring member adapted to coöperate with the stationary jaw and a relatively long resilient arm extending downward from the ring member and bent at an angle at its lower end and attached to the pole, a fruit conducting tube connected to the movable jaw and adapted when the latter is closed against the stationary jaw to lie substantially parallel with the pole, said arm normally throwing the movable jaw into open position and consequently the upper portion of the conduit away from the pole, an operating member connected at one end with the resilient arm of the movable jaw, and means for actuating the operating member to bring the movable jaw into fruit picking position.

2. In a fruit picker, the combination with a pole, of a stationary jaw carried at the top of the pole, a movable jaw including a ring member formed of a wire bent intermediate its ends, said wire being then extended in relatively long parallel strands to form a spring arm, the lower portion of said arm being bent at an angle and seated in the recess in the pole, means for attaching the lower end of the arm to the pile, a fruit picking tube attached to the ring of the movable jaw and adapted when the jaw is in closed position to lie substantially parallel to the pole and designed when such jaw is in open position to have the upper portion thereof extend at an angle to the pole, an operating cord connected to the spring arm of the movable jaw, and means for actuating the cord to bring the movable jaw into fruit picking position.

In testimony whereof, I affix my signature, in the presence of two witnesses.

ROBERT E. NORRIS.

Witnesses:
V. G. Douglas,
K. Armstrong.

Copies of this patent may be obtained for five cents each, by addressing the "Commissioner of Patents, Washington, D. C."